US008020744B2

(12) United States Patent
Palmer et al.

(10) Patent No.: US 8,020,744 B2

(45) Date of Patent: Sep. 20, 2011

(54) METHODS FOR CONNECTING A WIRE TO A METALIZED CIRCUIT PATH ON A PLASTIC PART

(75) Inventors: Timothy A. Palmer, Moon Township, PA (US); Robert R. Cunningham, Beaver, PA (US)

(73) Assignee: LANXESS Corporation, Pittsburgh, PA (US)

( * ) Notice: Subject to any disclaimer, the term of this patent is extended or adjusted under 35 U.S.C. 154(b) by 5 days.

(21) Appl. No.: 12/709,978

(22) Filed: Feb. 22, 2010

(65) Prior Publication Data

US 2010/0221945 A1 Sep. 2, 2010

Related U.S. Application Data

(60) Provisional application No. 61/208,727, filed on Feb. 27, 2009.

(51) Int. Cl.
*B23K 37/04* (2006.01)
*H01R 4/24* (2006.01)

(52) U.S. Cl. ....... 228/44.7; 228/49.5; 439/389; 439/865

(58) Field of Classification Search ........................ None
See application file for complete search history.

(56) References Cited

U.S. PATENT DOCUMENTS

| | | | | |
|---|---|---|---|---|
| 5,154,647 | A * | 10/1992 | Ishitani et al. | 439/66 |
| 5,593,739 | A | 1/1997 | Kickelhain | |
| 6,017,241 | A * | 1/2000 | Komai | 439/419 |
| 6,545,224 | B2 * | 4/2003 | Sawada et al. | 174/149 R |
| 7,060,421 | B2 | 6/2006 | Naundorf et al. | |
| 7,320,616 | B1 * | 1/2008 | Legrady et al. | 439/404 |
| 2002/0025716 | A1 * | 2/2002 | Kondo | 439/467 |
| 2002/0142676 | A1 * | 10/2002 | Hosaka et al. | 439/874 |
| 2004/0171295 | A1 * | 9/2004 | Canning et al. | 439/404 |
| 2005/0079754 | A1 * | 4/2005 | Goto et al. | 439/397 |
| 2005/0106927 | A1 * | 5/2005 | Goto et al. | 439/404 |
| 2005/0260874 | A1 * | 11/2005 | Murakami et al. | 439/142 |
| 2007/0099484 | A1 * | 5/2007 | Scheer et al. | 439/492 |
| 2008/0188099 | A1 * | 8/2008 | Takahashi | 439/77 |

* cited by examiner

*Primary Examiner* — Kiley Stoner
(74) *Attorney, Agent, or Firm* — Nicnaor A. Kohncke

(57) ABSTRACT

A method and apparatus for connecting wires to circuits, including the formation of at least one electrically conductive path having a plastic base with a metal foil formed of laser direct processes.

4 Claims, 3 Drawing Sheets

METHODS FOR CONNECTING A WIRE TO A METALIZED CIRCUIT PATH ON A PLASTIC PART

BACKGROUND OF THE INVENTION

Field of the Invention

The present invention relates generally to a process for connecting wires to circuits, as well as to the product of such a process. The process broadly includes the formation of at least one electrically conductive path on a plastic base with a metal foil.

Three-dimensional interconnect devices made of plastic (3D molded interconnect devices or 3D-MID) offer greater design opportunities than two-dimensional printed circuit boards. They can also be used to create sophisticated mechatronic systems that combine electrical and mechanical functions.

One technology for producing 3D-MIDs is the laser direct structuring process ("LDS"). This technology can be used to apply conductive tracks and electronic components to plastic interconnect devices. By way of background, reference is made to U.S. Pat. Nos. 5,576,073; 5,593,739; and 7,060,421, which are hereby incorporated by reference as if set forth in their entirety.

BRIEF SUMMARY OF THE INVENTION

There is broadly contemplated, in accordance with at least one embodiment of the present invention, a process for connecting wires to circuits, as well as to the product of such a process. Further there is contemplated, an embodiment wherein the aforementioned circuits are formed by LDS processes. In an embodiment, the process broadly includes the formation of at least one electrically conductive path on a plastic base with a metal foil.

DESCRIPTION OF THE INVENTION

Figure 2:
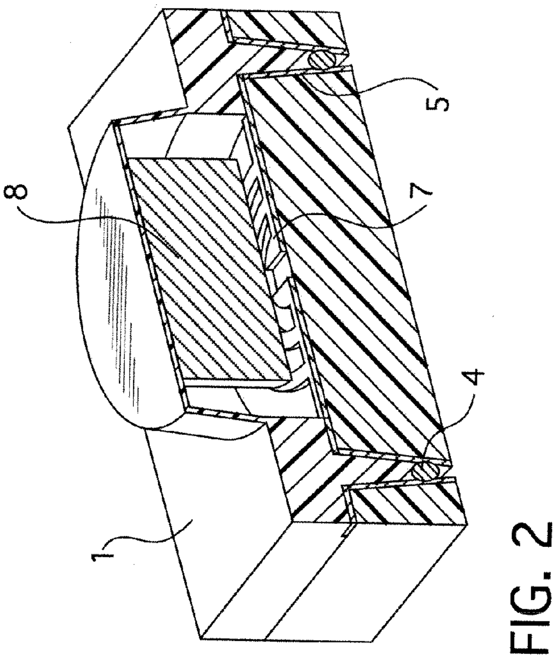
FIGS. 1 and 2 schematically illustrate an apparatus in accord with at least one embodiment of the present invention having wires with a non-insulated section of wire that can be pressed into metalized channels by blade features on a cover piece, thereby completing an electrical connection.

The product of the process, in at least one embodiment, is an apparatus comprising: a) a cover having a blade and a metal pill, b) a base having a metalized channel, c) an insulated wire having a non-insulated section of wire (pre-stripped section), and d) a metal foil. The blade may be operated so as to contact and apply pressure to the non-insulated section of wire thereby positioning the non-insulated section of wire in the metalized channel and allowing contact to occur between the non-insulated section of wire and the metal of the metalized channel. The connection provides a secure attachment between the wire and metal of the metalized channel.

Furthermore, the cover may be depressed so as to bring the metal pill and the metal foil (having a contact pattern) into contact thereby completing an electrical circuit. The cover may be formed of an elastomeric material.

The base may be formed of a thermoplastic material. For example, the base may be a polyester material made from a blend of polybutylene terephthalate (PBT) and polyethylene terephthalate (PET), such as that commercial available from LANXESS Corporation and sold under the brand name Pocan® DP T7140 LDS. The thermoplastic material may also contain a glass fiber and mineral content of 40 percent and a heat distortion temperature (HDT) (Bf) of 250° C.

In another embodiment, there are provided one or more bosses on the surface of the base capable of being aligned with on ore more openings in the cover and thereafter staked so as to fixedly attach the base and cover.

In another embodiment, there is provided an insulated wire that does not include a non-insulated section of wire. A metalized channel is further provided in the base which includes a metalized slot capable of receiving a metallic spade. The metallic spade may be positioned between the wire and the metallic slot whereby the insulation of the wire is displaced when the spade is placed into, and thereby forming a connection with, the metallic slot.

In another embodiment, there is provided a horn button design which makes use of a conductive path applied to a base having metal foil contact pattern. An elastomeric cover contains a metal pill that will complete a circuit when depressed into the contact pattern. The base may be molded in Pocan® DP T7140 LDS (black) PBT resin. This grade contains an additive that allows the desired circuit path on the surface of the part to be activated with a laser. The activated surface may then be selectively metalized to create the circuit.

As shown in the figures there may be included, among others, and in various embodiments and combinations, the following components:

a cap (1), a blade (notch) (2), an insulated wire section (3), a non-insulated wire section (4), a metalized channel (5), a base (6), a metal foil contact (7), a metal pill (8), a boss (9), a boss opening (10), and a metal spade (11).

Figure 1:
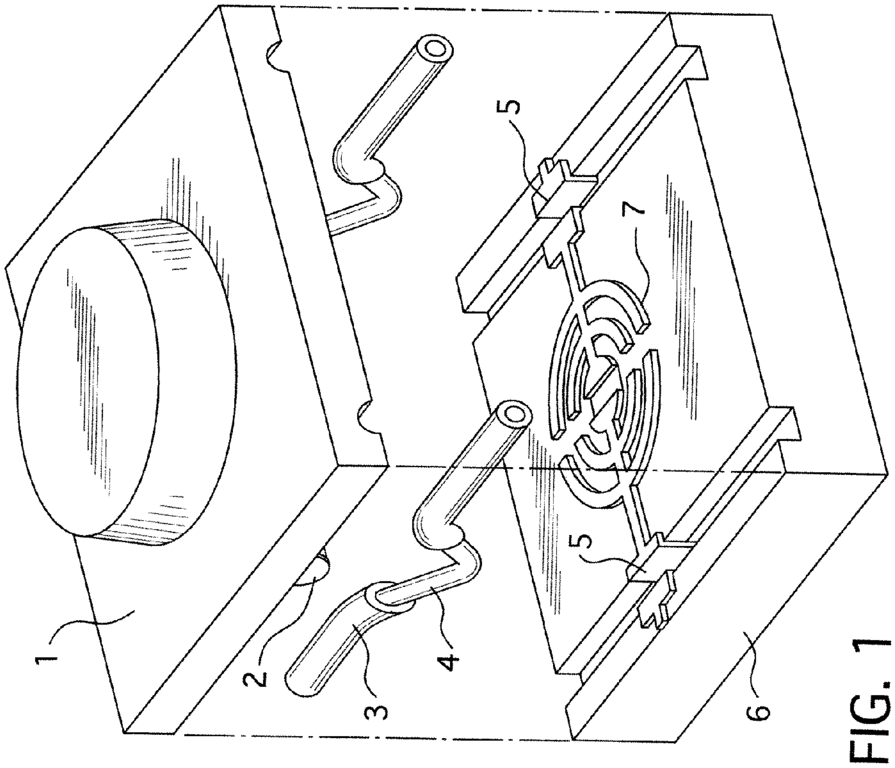

With reference to FIGS. 1 and 2 there is an apparatus in accord with at least one embodiment of the present invention having wires with a non-insulated section of wire that can be pressed into metalized channels by blade features on a cover piece, thereby completing an electrical connection. Solder or a conductive adhesive could also be used at the point of contact between wires and the metalized channels to improve the electrical connection. The apparatus can be completed using standard fasteners.

Figure 4:
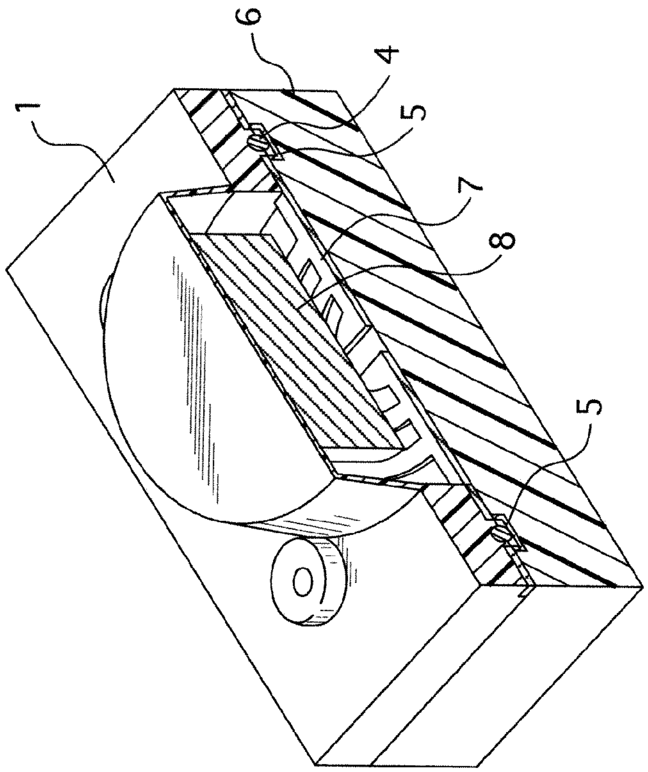
FIGS. 3 and 4 schematically illustrate an apparatus in accord with at least one embodiment of the present invention having wires with a non-insulated section of wire that can be laid in a metalized channel.
Figure 3:
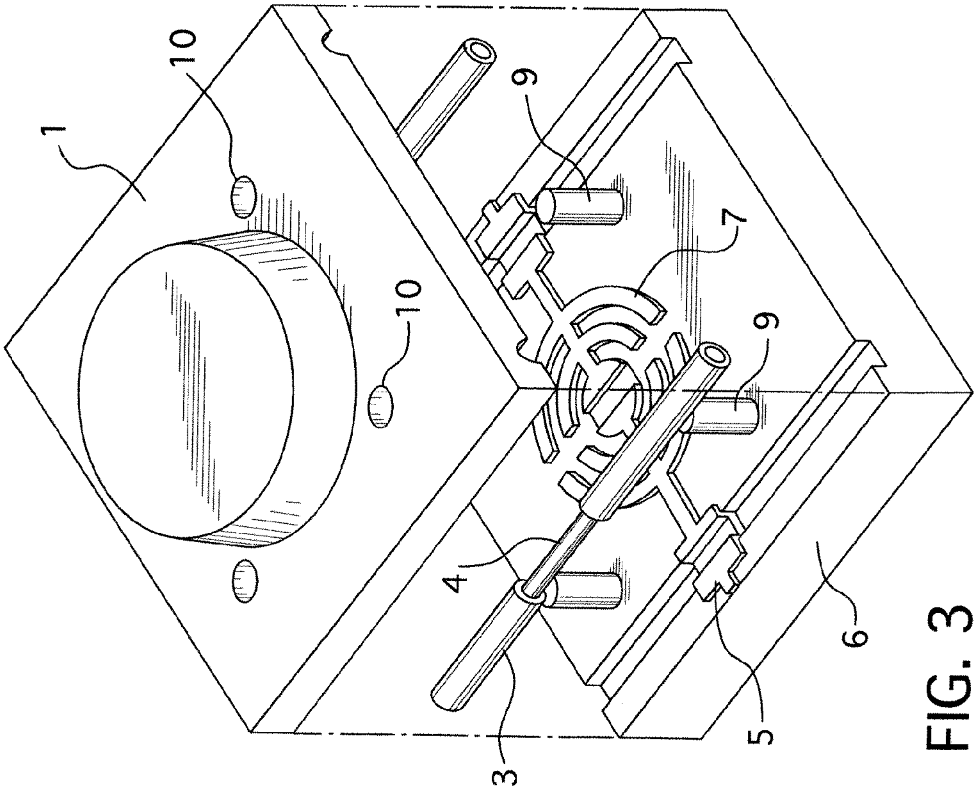

With reference to FIGS. 3 and 4 there is an apparatus in accord with at least one embodiment of the present invention having wires with a non-insulated section of wire that can be laid in a metalized channel. Bosses on the base piece are used to align to a cover piece which can then be heat staked to complete the joint. To improve the electrical connection, the heat staked bosses should be as close to the electrical contact point as possible. Alternatively, screws or other fasteners could be used to complete the assembly.

Figure 6:
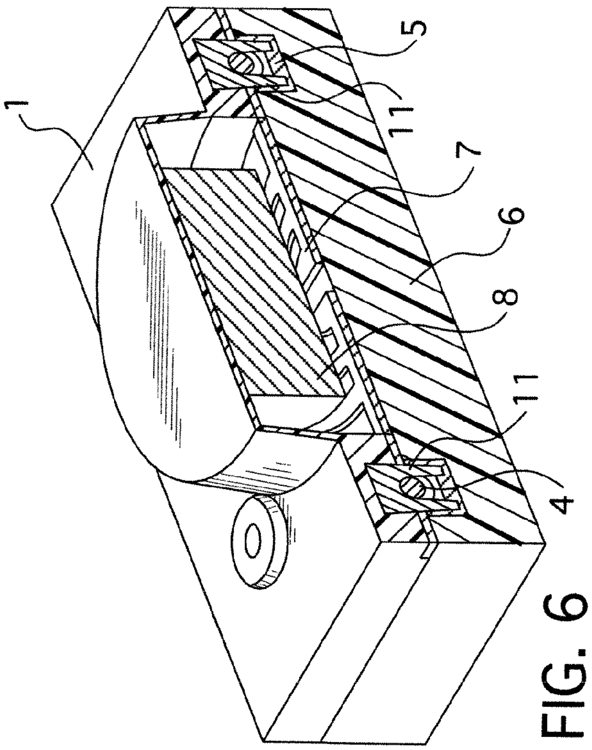
FIGS. 5 and 6 schematically illustrate an apparatus in accord with at least one embodiment of the present invention having insulated wires that can be laid in a channel which has a metalized slot perpendicular to the wire.
Figure 5:
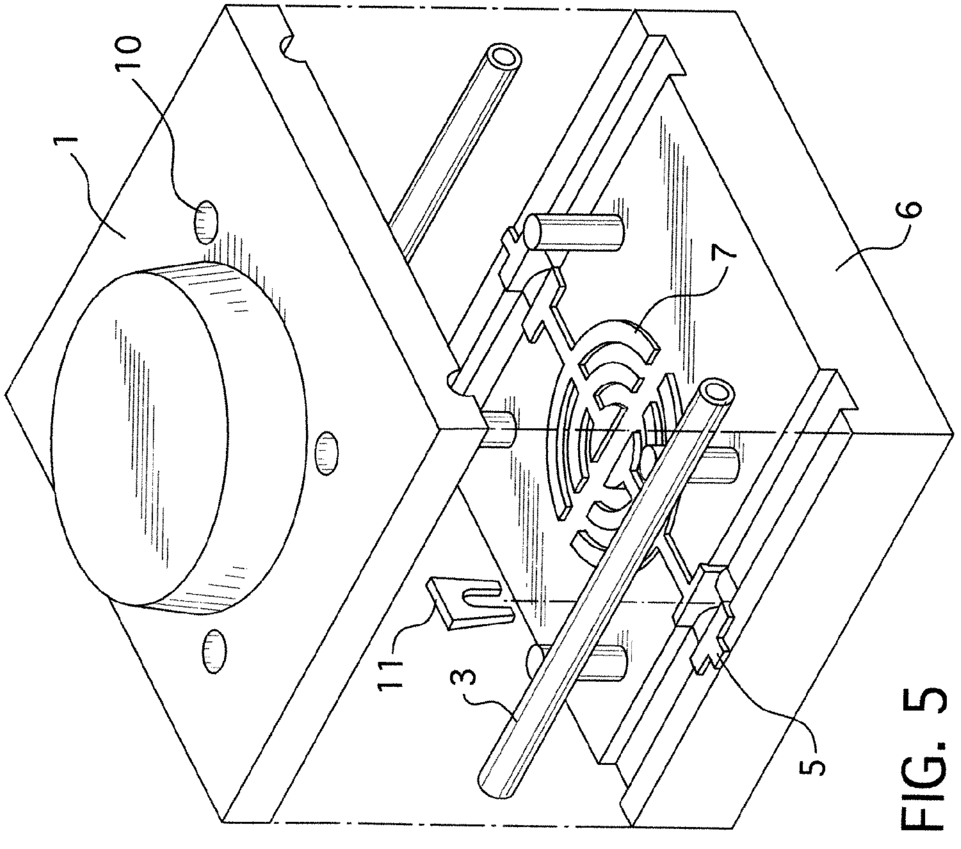

With reference to FIGS. 5 and 6 there is an apparatus in accord with at least one embodiment of the present invention having insulated wires that can be laid in a channel which has a metalized slot perpendicular to the wire. Metallic spades (which may be attached to the cover) are pressed into the slots, displacing the insulation on the wire and thereby completing the electrical connection with the metalized circuit.

Although the preferred embodiment of the present invention has been described herein with reference to the accompanying drawings, it is to be understood that the invention is not limited to that precise embodiment, and that various other changes and modifications may be affected therein by one skilled in the art without departing from the scope or spirit of the invention.

What is claimed is:

1. An apparatus comprising:

a) a cover having a metal pill and one or more openings, said openings being capable of receiving one or more bosses, b) a base having a channel, a portion of said channel comprising metal thereby forming a metalized channel section, said metalized channel section further comprising a metalized slot capable of receiving and thereby being fixedly attached to a metal spade, said base further comprising one or more bosses;

c) an insulated wire, d) a metal foil contact pattern, and e) a metal spade, wherein the metal spade is positioned between the cover and base such that one or more bosses are received by the openings and pressure is applied to the spade, said spade being brought into contact with the wire and displacing a portion of insulation thereby forming a metal section of wire that is positioned in the metalized channel section, and said metal spade forming a connection with the metal slot, thereby allowing contact to occur between the metal section of wire and the metalized channel section where an electrical connection may be formed.

2. The apparatus according to claim 1, wherein the cover and base are fixedly attached to one another by means of heat staking the bosses and openings together.

3. The apparatus according to claim 1, wherein the metalized channel section is formed by means of laser direct structuring processes.

4. The apparatus according to claim 1, wherein the metal foil contact pattern is formed by means of laser direct structuring processes.

* * * * *